(12) United States Patent
Woods et al.

(10) Patent No.: US 12,337,956 B2
(45) Date of Patent: Jun. 24, 2025

(54) SYSTEM AND METHOD FOR MONITORING CLUTCH WEAR

(71) Applicant: Textron Innovations Inc., Providence, RI (US)

(72) Inventors: Ron L. Woods, Weatherford, TX (US); Trenton A. Hamm, Cleburne, TX (US); Eric S. Olson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 324 days.

(21) Appl. No.: 18/172,859

(22) Filed: Feb. 22, 2023

(65) Prior Publication Data

US 2024/0278908 A1    Aug. 22, 2024

(51) Int. Cl.
*B64C 27/00* (2006.01)
*B64C 27/12* (2006.01)
*B64D 43/00* (2006.01)

(52) U.S. Cl.
CPC ............ *B64C 27/006* (2013.01); *B64C 27/12* (2013.01); *B64D 43/00* (2013.01)

(58) Field of Classification Search
CPC ........ B64D 43/02; B64D 15/20; B64D 43/00; B64D 15/12; B64D 1/18; B64D 1/20; B64D 15/16; B64D 15/22; B64D 2033/0286; B64D 33/02; B64D 45/00; B64D 33/08; B64C 1/064; B64C 13/02; B64C 13/08; B64C 13/18; B64C 27/56; B64C 29/0025;

(Continued)

(56) References Cited

U.S. PATENT DOCUMENTS 10,173,787 B1 *  1/2019  Oltheten ................ B64D 45/00
10,259,572 B2 *  4/2019  Hale .................... B64C 27/006
(Continued)

FOREIGN PATENT DOCUMENTS

EP         3913348 A1 *  11/2021  ............. B64C 25/34
KR      20200122593 A    10/2020
KR      102205546 B1 *  1/2021

OTHER PUBLICATIONS

"Helicopter Freewheel Unit Design Guide" SP055773387, https://apps.dtic.mil/dtic/tr/fulltext/u2/a047559.pdf, Oct. 31, 1977, 240 pages.

*Primary Examiner* — Andre J Allen
(74) *Attorney, Agent, or Firm* — Slater Matsil, LLP

(57) ABSTRACT

A method includes measuring a first rotational speed of a first element of a sprag clutch of a rotorcraft, measuring a second rotational speed of a second element of the sprag clutch, determining if the sprag clutch is in an overrunning condition, wherein the determining is based on the first rotational speed and the second rotational speed, generating an estimation of an instantaneous wear rate of the sprag clutch, wherein the estimation of the instantaneous wear rate is generated based on the first rotational speed and the second rotational speed, and displaying an indication of the estimation of the instantaneous wear rate of the sprag clutch. The method includes generating an estimation of an accumulated wear of the sprag clutch, wherein the estimation of the accumulated wear is based on the estimation of the instantaneous wear rate, and displaying an indication of the estimation of the accumulated wear.

20 Claims, 6 Drawing Sheets

(58) Field of Classification Search
CPC ......... B64C 3/182; B64C 13/04; B64C 13/44;
B64C 31/02; B64C 31/028; B64C 39/005
USPC ...................................................... 73/170.02
See application file for complete search history.

(56) References Cited

U.S. PATENT DOCUMENTS

| | | | |
|---|---|---|---|
| 10,793,284 B2* | 10/2020 | Prater | F16D 25/14 |
| 11,731,779 B2* | 8/2023 | Speller | B64C 27/20 |
| | | | 244/7 A |
| 2003/0183473 A1* | 10/2003 | Jensen | F16D 43/14 |
| | | | 192/105 R |
| 2017/0267364 A1 | 9/2017 | Fraenzel | |
| 2021/0364387 A1 | 11/2021 | Belhabib | |

* cited by examiner

SYSTEM AND METHOD FOR MONITORING CLUTCH WEAR

TECHNICAL FIELD

The present invention relates generally to a system and method for managing vehicle sensor systems, and, in particular embodiments, to a system and method for reducing data noise for vehicle monitoring sensors.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload. The systems for engines, transmissions, drive system, rotors, and the like, are critical to the safe operation of the rotorcraft in flight. The elements of system such as mechanical systems, electrical systems, hydraulic systems, and the like, are each subject to unique wear factors and monitoring, inspection or maintenance requirements.

SUMMARY

An embodiment method includes measuring a first rotational speed of a first element of a sprag clutch of a rotorcraft, measuring a second rotational speed of a second element of the sprag clutch, determining if the sprag clutch is in an overrunning condition based on the first rotational speed and the second rotational speed, generating an estimation of an instantaneous wear rate of the sprag clutch, and displaying an indication of the estimation of the instantaneous wear rate of the sprag clutch. The estimation of the instantaneous wear rate is generated based on the first rotational speed and the second rotational speed. In some embodiments, the method includes generating an estimation of an accumulated wear of the sprag clutch, wherein the estimation of the accumulated wear is based on the estimation of the instantaneous wear rate, and displaying an indication of the estimation of the accumulated wear of the sprag clutch.

An embodiment clutch wear monitoring system includes a first sensor operable to measure a first rotational speed of a first element of a clutch and generate a first sensor signal associated with the first rotational speed and a second sensor operable to measure a second rotational speed of a second element of the clutch and generate a second sensor signal associated with the second rotational speed. The embodiment clutch wear monitoring system also includes a controller configured to receive the first sensor signal from the first sensor, receive the second sensor signal from the second sensor, determine an overrunning condition of the clutch based on the first sensor signal and the second sensor signal, determine a surface wear rate for the clutch based on the overrunning condition, the first sensor signal, and the second sensor signal. The controller is also configured to generate a wear signal associated with the surface wear rate. The embodiment clutch wear monitoring system also includes a display panel configured to receive the wear signal from the controller and display an indication of the surface wear rate based on the wear signal.

An embodiment device includes a processor and a non-transitory computer-readable storage medium storing a program to be executed by the processor. The program includes instructions for monitoring an inner element speed of an inner element of a sprag clutch, monitoring an outer element speed of an outer element of the sprag clutch, determining a pressure-velocity parameter for the sprag clutch, wherein the pressure-velocity parameter is based on the inner element speed and the outer element speed, determining a wear rate for the inner element of the sprag clutch, wherein the wear rate is based on the pressure-velocity parameter, and providing an indication of the wear rate on an instrument panel.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
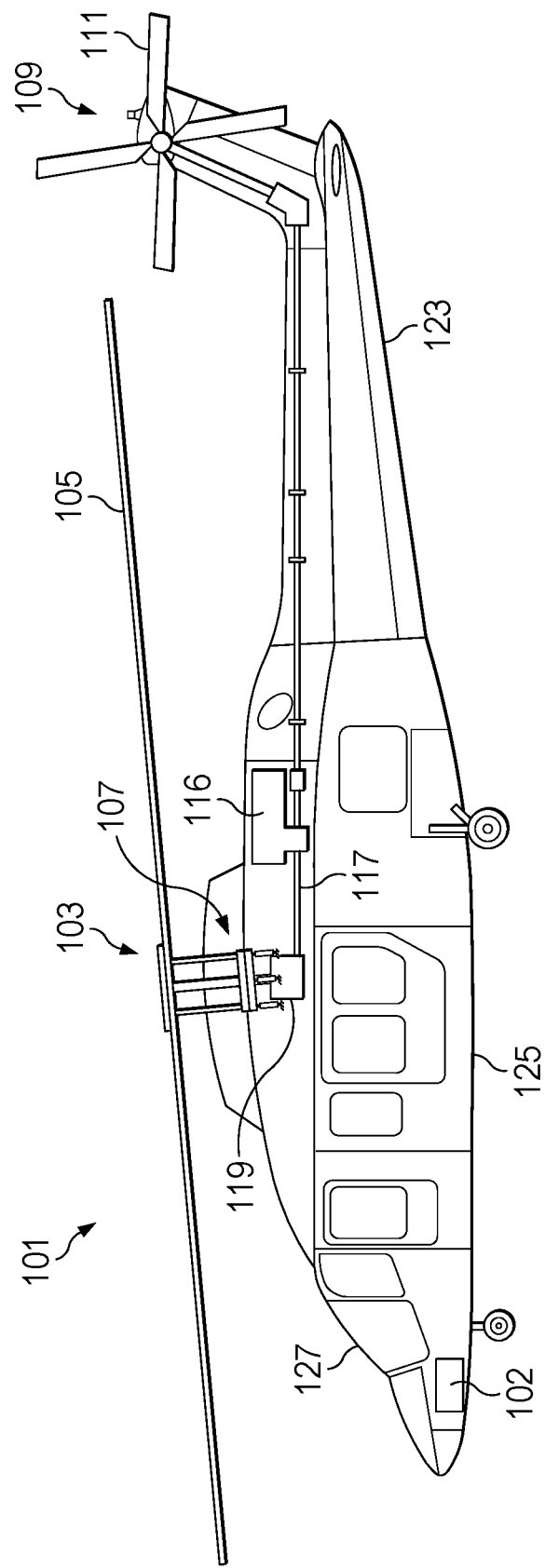
FIG. 1 illustrates a rotorcraft, in accordance with some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc.

described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Some aircraft, such as rotorcraft, have one or more overrunning clutches (e.g., freewheeling clutches, sprag clutches, or the like). An overrunning clutch transmits torque in one rotational direction (e.g., the "engaged direction") but does not transmit torque in the opposite rotational direction (e.g., the "reverse direction"). As an example, an overrunning clutch may comprise a rotating inner element and a rotating outer element. When the rotational speed of the inner element is greater than the rotational speed of the outer element, the overrunning clutch is in an "overrunning" condition (e.g., a "freewheeling" condition) in which the inner element and outer element rotate independently, and no torque is transferred between the inner element and the outer element. In some cases, when the rotational speed of the outer element is the same as (or greater than) the rotational speed of the inner element, the clutch engages and the inner element and outer element rotate together, as if a single rotating element.

Overrunning clutches may have various utilizations within a rotorcraft. As an example, an overrunning clutch may couple a starter to an engine to allow the starter to be decoupled once the engine reaches sufficient speed. As another example, the engines of a multi-engine rotorcraft may be coupled by an overrunning clutch to control torque transfer between engines. For example, a first engine may be started before a second engine, with the overrunning clutch remaining in an overrunning condition until the rotational speed of the second engine reaches that of the first, at which point the clutch engages and the engines are coupled. As another example, an overrunning clutch may couple the engine(s) to the rotor in order to allow autorotation of the rotor during engine failure. Other example utilizations are possible.

Embodiments presented herein are directed to determining estimates of the wear, accumulated life, or remaining life of a sprag clutch or other type of overrunning clutch. In some cases, certain operating regimes of a rotorcraft may cause more wear within a sprag clutch than others. This can make estimating the actual accumulated wear of a sprag clutch difficult, and a sprag clutch may be replaced earlier in its life than necessary out of precaution. Embodiments herein allow for an estimation of the wear rate of a sprag clutch for different operating conditions of a rotorcraft. Additionally, an estimation of the total accumulated wear of a sprag clutch can be determined, from which an estimation of the remaining life of a sprag clutch can be determined. In some embodiments, an indication of the wear rate, the total accumulated wear, and/or the remaining life of a sprag clutch is displayed. In this manner, rotorcraft conditions that produce more wear can be avoided, which can increase the life of the sprag clutch, which in turn can reduce the frequency of replacement. Additionally, a sprag clutch can be replaced based on its remaining life estimation, which can also reduce the frequency of replacement. In this manner, the repair cost, part replacement cost, and maintenance time of a rotorcraft can be reduced.

The techniques for determining clutch wear described herein may be applied to a variety of rotorcraft, such as helicopters, tiltrotor aircraft, manned rotorcraft, unmanned rotorcraft, multi-engine rotorcraft, multi-rotor rotorcraft, or the like. The techniques described herein may be included in, implemented by, or executed by one or more systems within a rotorcraft. For example, in some embodiments, the clutch wear techniques described herein may be executed by an avionics system, a fly-by-wire (FBW) system, a health and usage monitoring system (HUMS), or the like. In other embodiments, the clutch wear estimation techniques described herein may be included in a clutch monitoring system, which may be a standalone rotorcraft system, may be a separate system communicatively coupled to another rotorcraft system(s), or may be part of another rotorcraft system. These are examples, and other rotorcraft or rotorcraft systems are possible. In other embodiments, the clutch wear estimation techniques described herein may be included in another type of aircraft such as a fixed-wing aircraft.

In some embodiments, the rotorcraft may include a FBW system to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like. The FCCs may provide these functions according to control laws (CLAWS). In some embodiments, multiple FCCs are provided for redundancy. One or more modules within the FCCs may be partially or wholly embodied as software and/or hardware for performing any functionality described herein. In some embodiments, the clutch wear estimation techniques described herein may be executed by the FCCs or by the CLAWS. In some embodiments, the CLAWS could control the flight of the rotorcraft based on the estimated clutch wear, such as controlling the flight in a manner that minimizes the estimated clutch wear or avoids conditions associated with high estimated clutch wear.

FIG. 1 illustrates a rotorcraft 101. according to some embodiments. The rotorcraft 101 includes rotorcraft computers 102. The rotorcraft computers 102 may be operable to collect data about the rotorcraft 101 or control flight of the rotorcraft 101. In some embodiments, the rotorcraft computers 102 may be FCCs of a FBW system of the rotorcraft 101. The rotorcraft computers 102 may be operable to perform sensor data collection and analysis as part of a health and usage monitoring system (HUMS), a sensor system, a flight control system, a monitoring system, or the like. The rotorcraft computers 102 may be operable to determine an estimate of clutch wear as described herein or may be operable to perform sensor data collection and analysis as part of a clutch monitoring system as described herein.

The rotorcraft 101 includes a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators.

The rotorcraft 101 further includes a fuselage 125 and tail section 123. The tail section 123 may have other flight control devices such as horizontal or vertical stabilizers, rudders, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Power is supplied to the main rotor system 103 and the anti-torque system by engines 116. There may be one or more engines 116, which may be controlled according to signals from the FBW system. The output of the engines 116 is provided to a driveshaft 117, which is mechanically and operatively coupled to the rotor system 103 and the anti-torque system through a main rotor transmission 119 and a tail rotor transmission, respectively. Other components may be mechanically coupled to the engines 116 or the main rotor transmission 119, such as an accessory gearbox or the like.

In some embodiments, the rotorcraft 101 may include one or more overrunning clutches such as sprag clutches (not separately illustrated in FIG. 1). For example, the main rotor system 103 may be coupled to one or more engines 116 by one or more overrunning clutches within the main rotor transmission 119, or two or more engines 116 may be coupled together by one or more overrunning clutches within the main rotor transmission 119. Other implementations or configurations of overrunning clutches are possible and considered within the scope of the present disclosure.

The rotorcraft 101 also includes sensors (not individually illustrated) that may be in communication with other rotorcraft systems such as the rotorcraft computers 102, a clutch wear monitoring system, a FBW system, FCCs, a HUMS, avionics, instrument panel(s), or the like. The sensors may include sensors for monitoring operation of the rotorcraft, providing pilot data, providing condition data, or the like, and may include measuring a variety of rotorcraft systems, operating conditions, flight parameters, environmental conditions, component conditions, and the like. For example, the sensors may include sensors for gathering flight data, and may include sensors for measuring airspeed, altitude, attitude, position, orientation, temperature, airspeed, vertical speed, and the like. In some embodiments, the sensors may include sensors for measuring the rotational speed of components, such as components coupled by an overrunning clutch. The sensors may include sensors relying upon data or signals originating external to the rotorcraft, such as a global positioning system (GPS) sensor, a very high frequency (VHF) omnidirectional range sensor, Instrument Landing System (ILS), and the like. In some embodiments, signals or values communicated by the sensors may be processed by the sensors or by other systems. For example, values measured by a sensor may be averaged or filtered. Other examples are possible.

Figure 2:
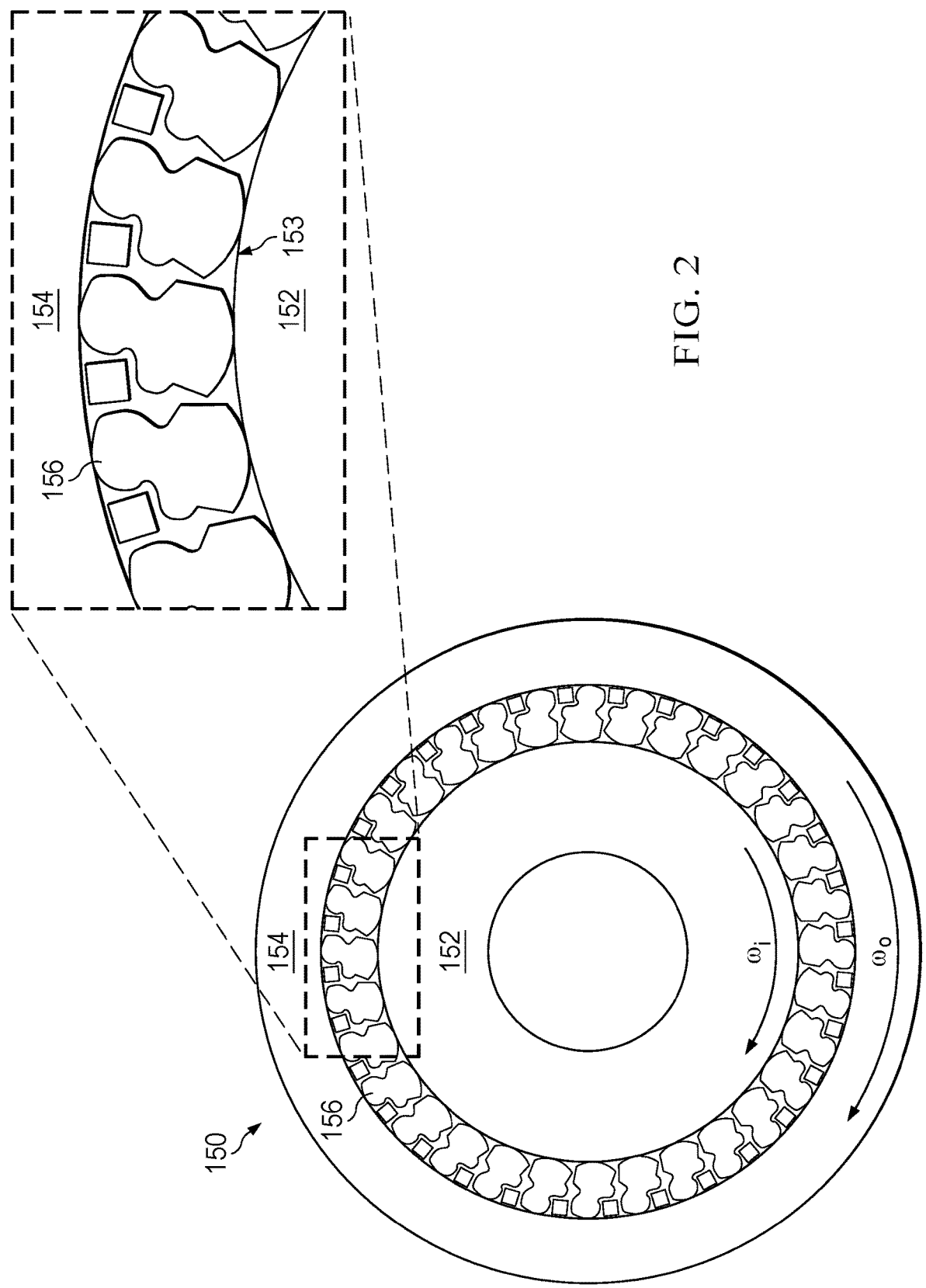
FIG. 2 illustrates a sprag clutch, in accordance with some embodiments.

Turning to FIG. 2, a cross-sectional schematic of an example sprag clutch 150 is shown, in accordance with some embodiments. A magnified portion of the sprag clutch 150 is also shown. The sprag clutch 150 shown in FIG. 2 comprises an inner element 152, an outer element 154, and multiple sprags 156. The inner element 152 and the outer element 154 may be independently attached to rotating components such as shafts, gears, or the like. The inner element 152 may also be called an "inner race" or "inner raceway" and the outer element 154 may also be called an "outer race" or "outer raceway." The sprags 156 are elements disposed between the inner element 152 and the outer element 154 that allow the outer element 154 to rotate relative to the inner element 152 in one direction but not the opposite direction. For example, when the rotational speed $w_i$ of the inner element 152 is equal to (or less than) the rotational speed $\omega_o$ of the outer element 154, the sprags 156 engage with the inner surface 153 of the inner element 152 and allow torque to be transferred between the inner element 152 and the outer element 154. In this manner, the inner element 152 and the outer element 154 may be driven at the same rotational speed. When the rotational speed $\omega_o$ of the outer element 154 is less than the rotational speed $\omega_i$ of the inner element 152, the sprags 156 disengage with the inner surface 153 of the inner element 152 and allow the inner element 152 to independently rotate (e.g., "overrun" or "freewheel") with respect to the outer element 154. The sprag clutch 150 in FIG. 2 is an example shown for illustrative purposes, and other configurations of sprag clutches, overrunning clutches, or the like are possible and considered within the scope of the present disclosure.

In some cases, a sprag clutch (e.g., sprag clutch 150) in an overrunning state may experience wear (e.g., polishing, pitting, or the like) at the inner surface 153 of the inner element 152 due to the movement of the sprags 156. In some cases, a sprag clutch (e.g., sprag clutch 150) in an overrunning state may experience wear on the sprags 156 due to relative movement against the inner surface 153 of the inner element 152. Wear within the sprag clutch may accumulate over time, and may eventually result in failure of the sprag clutch (e.g., due to "sprag popping" or other failure modes). In this manner, the remaining usable life of a sprag clutch may depend on its amount of accumulated wear. Accordingly, sprag clutches are routinely replaced before the accumulated wear may be significant enough to risk failure. However, some operating conditions of the rotorcraft (e.g., combinations of the rotational speeds $\omega_i$ and $\omega_o$ of an overrunning sprag clutch) may produce wear at a greater rate than other operating conditions. Thus, the total accumulated wear and the remaining useable life of a sprag clutch may depend on the operating history of the rotorcraft, which can make accurately estimating the remaining useable life of a sprag clutch difficult. Some embodiments described herein are directed toward providing a system and techniques for determining an estimation of the remaining useable life of a sprag clutch.

As described above, because different operating conditions can result in different amounts of wear for a sprag clutch in an overrunning condition, the "wear rate" of the inner surface 153 may be different under different operating conditions. In some embodiments, an estimate of the wear rate of the inner surface 153 of an overrunning sprag clutch may be determined using a non-linear function of pressure, rotational speed (e.g., rotational velocity), surface roughness, and lubricant film thickness. In some embodiments, the wear rate W of the inner surface 153 of an overrunning sprag clutch is determined using the function:

$$W = (PV \cdot K(\lambda))/(E' \cdot \sqrt{\Sigma/R_x}). \tag{1}$$

The wear rate W may have units such as micro-inches per second or the like. The wear rate W described by Function (1) is an instantaneous wear rate that depends on the operating conditions of the rotorcraft. The wear rate W also may depend on the operating history of the rotorcraft and/or the total accumulated wear of the sprag clutch, described in greater detail below. Thus, the wear rate W may have a value that changes during operation of the rotorcraft and over the life of the rotorcraft.

In Function (1), PV is a pressure-velocity parameter that depends on the relative rotational speeds of the inner element (e.g., inner element 152) and the outer element (e.g., outer element 154) of the overrunning clutch. In some embodiments, PV is determined by:

$$PV = (\omega_i - \omega_o) \cdot (A_1 \cdot \omega_o^2 + A_2). \tag{2}$$

In Function (2), $\omega_i$ is the rotational speed of the inner element (e.g., "the inner speed") and $\omega_o$ is the rotational speed of the outer element (e.g., "the outer speed"). The parameters $A_1$ and $A_2$ are constants that may be different for different types, models, or characteristics of rotorcraft, for different types, models, or characteristics of overrunning clutches, or the like. The parameters $A_1$ and $A_2$ may be measured, modeled, or empirically determined.

$\lambda = (B_1/\Sigma) \cdot (\omega_i - \omega_o)^C / (B_2 + B_3 \cdot \omega_o^2)^D$ In Function (1), the lambda ratio $\lambda$ is a parameter that represents a ratio between lubricant film thickness and surface roughness within a sprag clutch, and the parameter K is a parameter that depends on the lambda ratio $\lambda$. In some embodiments, the lambda ratio $\lambda$ is determined by:

$$\lambda = (B_1/\Sigma) \cdot (\omega_i - \omega_o)^C / (B_2 + B_3 \cdot \omega_o^2)^D. \tag{3}$$

In Function (3), the inner speed $\omega_i$ and the outer speed $\omega_o$ are the same rotational speeds described above for Function (2). The parameter $\Sigma$ represents a composite surface roughness of both the inner surface 153 and the sprags 156. In some cases, the composite surface roughness $\Sigma$ may decrease over time due to polishing of the inner surface 153 from wear. Accordingly, in some embodiments, the composite surface roughness $\Sigma$ may depend on a determined total accumulated wear and/or a previously determined value of the lambda ratio $\lambda$. In this manner, the lambda ratio $\lambda$ may depend on a determined total accumulated wear, in some embodiments.

In this manner, embodiments described herein allow for a determination of the instantaneous wear rate W of a sprag clutch by monitoring the inner speed $\omega_i$ and outer speed $\omega_o$ of the sprag clutch and applying the Functions (1), (2), and (3). For example, in some embodiments, the inner speed $\omega_i$ may correspond to the rotational speed of a first rotorcraft engine and the outer speed $\omega_o$ may correspond to the rotational speed of a second rotorcraft engine, in which the two engines are connected by the sprag clutch. The rotational speeds may be measured by appropriate sensors, for example. Other configurations or applications are possible.

Figure 3:
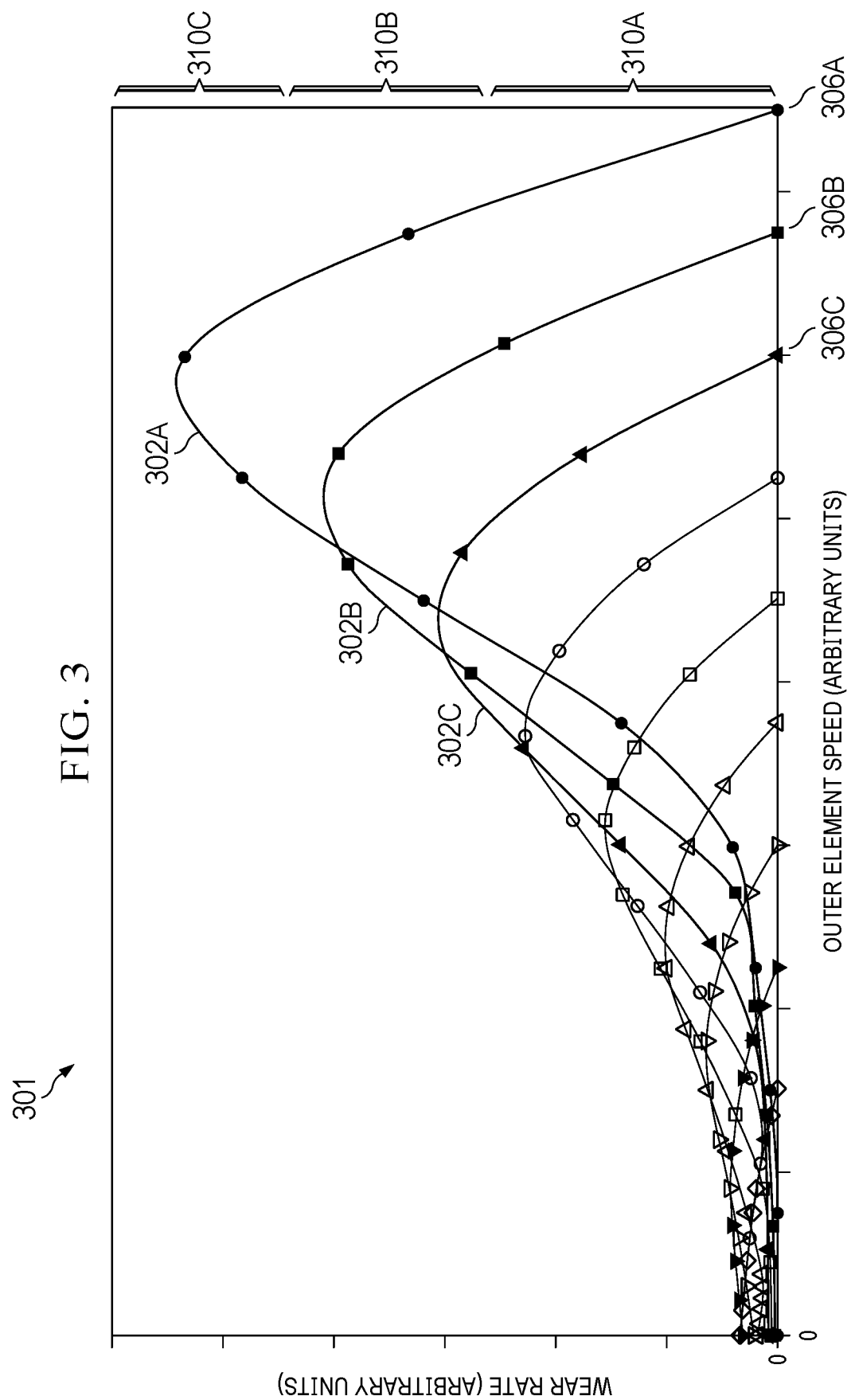
FIG. 3 is a graph of the wear rate for a sprag clutch in an overrunning condition, in accordance with some embodiments.

FIG. 3 shows a graph 301 that illustrates the determination of wear rate for a sprag clutch in an overrunning condition, in accordance with some embodiments. Graph 301 illustrates calculated wear rates (e.g., wear rate W) for a sprag clutch in an overrunning condition in which the outer speed (e.g., $\omega_o$) is less than the inner speed (e.g., $\omega_i$). As an example, this situation may represent a first engine connected to the inner member of a sprag clutch and a second engine connected to the outer member of the sprag clutch, in which the second engine's speed is less than the speed of the first engine. In this manner, this situation may represent a staggered engine start-up of a multi-engine rotorcraft. Other situations or representations are possible.

Graph 301 shows example curves of instantaneous wear rate (e.g., W) versus outer speed (e.g., $\omega_o$) for multiple fixed values of inner speed (e.g., $\omega_i$). The wear rates of graph 301 are determined by applying the Functions (1)-(3) to various combinations of inner speed (e.g., $\omega_i$) and outer speed (e.g., $\omega_o$). As examples, curves 302A-C are specifically indicated in FIG. 3, in which curve 302A represents a larger fixed inner speed than curve 302B, and curve 302B represents a larger fixed inner speed than curve 302C. The range of outer speeds for each curve is from zero (e.g., 0 RPM) to the fixed inner speed corresponding to that curve.

As shown in FIG. 3, some combinations of inner speed and outer speed result in a greater wear rate than other combinations. For example, when the outer speed is at or near zero, the wear rate is relatively small. When the outer speed is equal to the inner speed, the sprags engage, there is no relative motion between the inner element and the outer element, and thus the wear rate is zero (e.g., 0 micro-inches per second). This is indicated in FIG. 3 for curves 302A-C at respective example points 306A-C, for which the outer speed is equal to the corresponding fixed inner speed and the wear rate is zero. At other combinations of inner speed and outer speed, the wear rate may be relatively larger. The maximum wear rate of each curve may be greater for a greater fixed inner speed. As illustrative examples, combinations of inner speed and outer speed within wear range 310A of FIG. 3 may be considered "low wear" conditions, combinations of inner speed and outer speed within wear range 310B may be considered "medium wear" conditions, and combinations of inner speed and outer speed within wear range 310C may be considered "high wear" conditions. This is an example, and other combinations or configurations of wear ranges are possible. In some embodiments, the particular wear range (e.g., "low," "medium," or "high") in which the rotorcraft is operating may be displayed on a screen or interface.

In some embodiments, an estimate of accumulated wear of the sprag clutch over a duration of time may be determined from the instantaneous wear rate W calculated from Functions (1)-(3). For example, the instantaneous wear rate W may be continuously or periodically calculated over a duration of time, and the calculated values of the wear rate W are then integrated or otherwise summed to determine an amount of accumulated wear over that duration of time. The instantaneous wear rate W may have different values over the duration of time, depending on how the operating conditions of the rotorcraft change over the duration of time. Thus, the accumulated wear may depend on the particulars of how the rotorcraft is operated.

In some embodiments, the amount of accumulated wear may be determined starting from the installation of the sprag clutch. In this manner, the total accumulated wear of the sprag clutch may be determined throughout the life of the sprag clutch. In this manner, the sprag clutch may be replaced before it reaches some threshold amount of total accumulated wear, such as before the sprag clutch accumulates an unsafe amount of wear. In some embodiments, the total accumulated wear of a sprag clutch may correspond to the usable life remaining for that sprag clutch. In some embodiments, an indication of usable life remaining for a sprag clutch may be displayed on an interface. In this manner, a sprag clutch may be replaced based on the actual accumulated usage of the sprag clutch rather than on a less accurate metric, such as accumulated flight time.

Figure 4:
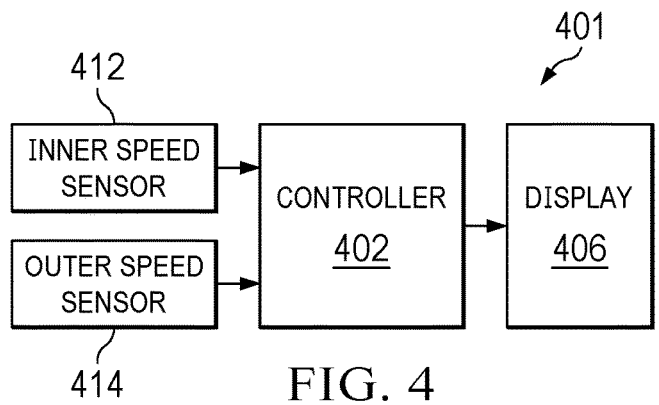
FIG. 4 is a block diagram for a clutch wear monitoring system, in accordance with some embodiments.

FIG. 4 is a block diagram illustrating a clutch monitoring system 401 for generating estimates of clutch wear and/or accumulated clutch wear, in accordance with some embodiments. The clutch monitoring system 401 may apply the clutch wear estimation techniques described herein, which may include Functions (1)-(3). In some embodiments, the clutch monitoring system 401 may be connected to one or more aircraft sensors, rotorcraft computers 102, FCCs, other system components, or a combination of components. In some embodiments, the clutch monitoring system 401 may be implemented as a standalone system that communicates with, but that is operationally separate from, other elements of the rotorcraft. In other embodiments, the clutch monitoring system 401 may be operable to perform sensor data collection and analysis as part of a health and usage monitoring system (HUMS), a sensor system, a flight control system, a monitoring system, or the like. The clutch monitoring system 401 may comprise a terminal that stores raw sensor data from one or more aircraft components, and provides the raw sensor data to a server for interpretation and analysis. In other embodiments, the clutch monitoring system 401 may interpret raw sensor data to determine an estimate of clutch wear and/or accumulated clutch wear for a server or other system that analyzes or displays the data.

In some embodiments, the clutch monitoring system 401 comprises an inner speed sensor 412, an outer speed sensor 414, and a controller 402. The inner speed sensor 412 senses the rotational speed of the inner element of a sprag clutch and the outer speed sensor 414 senses the rotational speed of the outer element of the sprag clutch. The inner speed sensor 412 and the outer speed sensor 414 are communicatively coupled to the controller 402 such that the controller 402 receives sensor data or signals from the inner speed sensor 412 and the outer speed sensor 414 either directly or indirectly. The sensors 412/414 may continuously or periodically send sensor signals, may send the sensor signal in response to a query, activation signal or the like, may send the sensor signal in response to a predetermined condition, may store the sensor signal for processing at the sensor 412/414, or may send or provide the signal according to another procedure.

The controller 402 may be any type of controller and may have a processor such as a microprocessor, a microcontroller, an application-specific integrated circuit, a field programmable gate array, or the like. The controller 402 may further include a non-transitory computer readable medium having a program for execution by the processor stored thereon. The program may include instructions for determining clutch wear and/or accumulated clutch wear as described herein. For example, the controller 402 may analyze, interpret, or process signals received from the sensors 412/414 to determine an estimate of clutch wear and/or accumulated clutch wear. In some embodiments, the controller 402 may transmit sensor signals from the sensors 412/414 or may transmit processed sensor signals (e.g., signals indicating clutch wear) to another component, such as to rotorcraft computers 102, FCCs, or the like. In other embodiments, the controller 402 may be part of another rotorcraft component, such as the rotorcraft computers 102, FCCs, or the like.

In some embodiments, the clutch monitoring system 401 may comprise a display 406, which may be a standalone component or part of another component such as a screen within the cockpit, an instrument panel, a flight director display, or the like. The display 406 may be operable to display or indicate data, an alert, a warning, a system status, or the like, based on a signal received from the controller 402. For example, the controller 402 may transmit a signal to the display 406 that instructs the display 406 to indicate a condition of the clutch wear rate, the clutch life, or the like. Some examples of indicated conditions that may be presented by a display 406 are described in greater detail below. The display 406 may generate an audible indication, in some embodiments.

Figure 5:
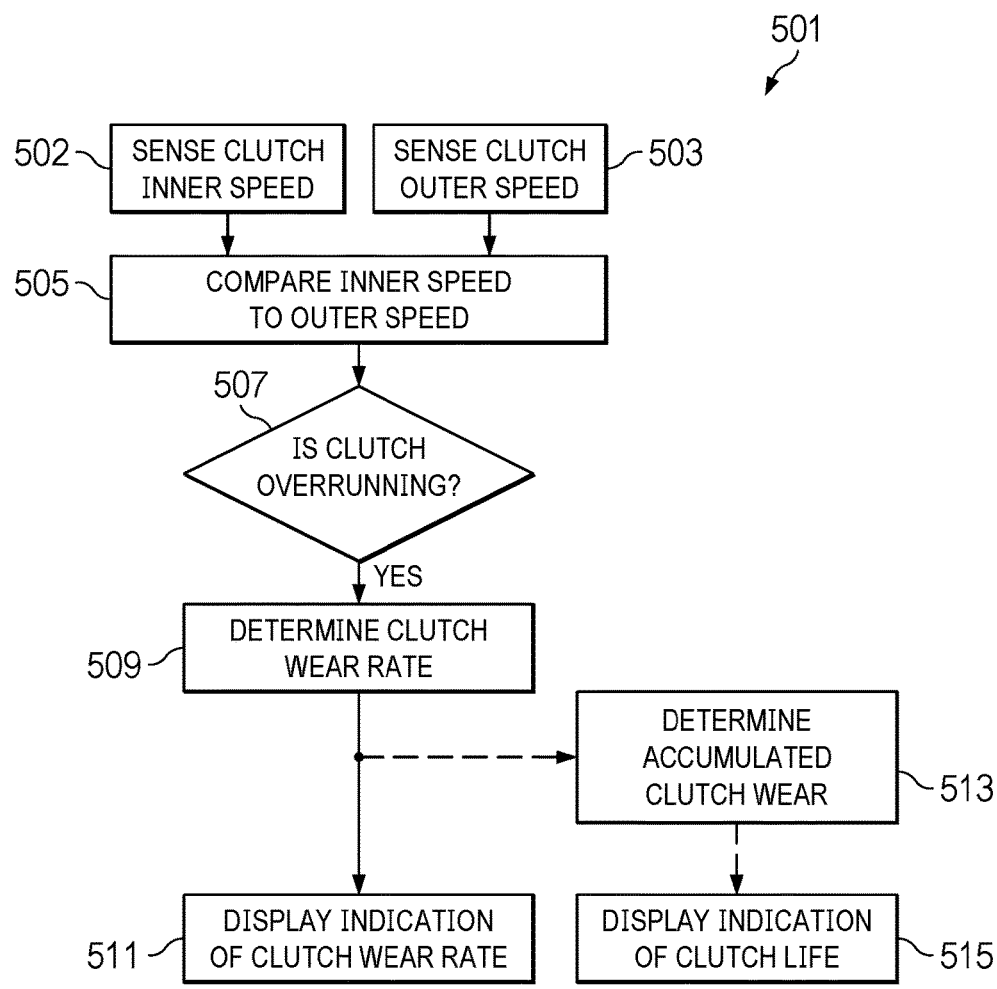
FIG. 5 is a flow diagram illustrating a process for determining the wear rate of a sprag clutch, in accordance with some embodiments.

FIG. 5 is a flow diagram illustrating a process 501 for determining the wear of a sprag clutch, in accordance with some embodiments. The process may be performed by a system having a data terminal and data server, and may be embodied in a software program stored on a non-transitory computer-readable storage medium that is executed by a processor of the data terminal and a processor of the data server. For example, the process may be performed by the clutch monitoring system 401, the rotorcraft computers 102, the FCCs, or the like.

In blocks 502 and 503, the inner speed and the outer speed of the sprag clutch are sensed or measured. The inner speed and the outer speed may be measured, for example, by sensors such as the inner speed sensor 412 and the outer speed sensor 414.

In block 505, the inner speed is compared with the outer speed. For example, the inner speed could be compared with the outer speed to determine if the inner speed is greater than, less than, or equal to the outer speed. The direction of rotation of the inner speed and/or the outer speed can also be compared. In some embodiments, signals representing the inner speed and outer speed may be transmitted from sensors (e.g., sensors 412/414) to a controller (e.g., controller 402). Upon receiving the signals, the controller may analyze or otherwise process the signals to compare the inner speed and outer speed. For example, an average or other statistical value may be determined from multiple signals before and/or after the comparison.

In block 507, the result of the comparison performed in block 505 is used to determine if the sprag clutch is in an overrunning condition. For example, if the inner speed is equal to the outer speed, it may be determined that the sprag clutch is not in an overrunning condition. Whether or not the sprag clutch is in an overrunning condition may depend on the configuration or application of the sprag clutch. For example, in some cases, an inner speed greater than an outer speed may indicate an overrunning condition, and in other cases, an outer speed greater than an inner speed may indicate an overrunning condition. If it is determined that the sprag clutch is in an overrunning condition, the process continues to block 509.

In block 509, a clutch wear rate for the sprag clutch is determined. The clutch wear rate may be an estimate of instantaneous clutch wear rate determined by applying Functions (1)-(3), in some embodiments. In some embodiments, the determination of the clutch wear rate is based on the inner speed measured in block 502 and the outer speed measured in block 503. In other embodiments, the clutch wear rate may be determined using other functions, formulas, or techniques. The clutch wear rate may be determined by a controller (e.g., controller 402) or the like. The collection of sensor data, comparison of inner speed and outer speed, and determining of the clutch wear rate may be repeated any number of times and performed periodically or continuously.

In block 511, an indication of the clutch wear rate determined in block 509 is displayed. The clutch wear rate may be displayed on a suitable display, screen, or panel, such as the display 406 in FIG. 4. The indication of clutch wear rate may be, for example, a numerical value, a graphical indication, a buzzer or voice prompt, a text indication such as a note or other warning on a display, or the like, or may be provided as a dedicated visual indicator such as a dedicated warning light, lamp, the like, or a combination thereof. In some embodiments, the indication of clutch wear rate may correspond to a wear range (e.g., "low," "medium," or "high"), which may be similar to the wear range 310A-C described previously for FIG. 3. Illustrations of example graphical indications of clutch wear rates are shown below in FIGS. 6A-6C, though a clutch wear rate may be indicated differently than the examples in FIGS. 6A-6C. In other embodiments, an indication of the clutch wear rate is not displayed.

In optional block 513, the accumulated clutch wear for the sprag clutch is determined based on the clutch wear rate determined in block 509. The accumulated clutch wear may be determined from the clutch wear rate by integration, summation, or the like. In some embodiments, an estimation of clutch life, such as the accumulated clutch life or the remaining clutch life, may be determined from the accumulated clutch wear. For example, a fraction of accumulated clutch life may be determined by dividing the accumulated clutch wear by a value of maximum clutch wear corresponding to the end of a clutch's usable life. Other techniques for determining the clutch life are possible. The clutch wear rate and/or clutch life may be determined by a controller (e.g., controller 402) or the like.

In optional block 515, an indication of the clutch life determined in block 513 is displayed. The clutch life may be displayed on a suitable display, screen, or panel, such as the display 406 in FIG. 4. The indication of clutch life may be, for example, a numerical value, a graphical indication, a buzzer or voice prompt, a text indication such as a note or other warning on a display, or the like, or may be provided as a dedicated visual indicator such as a dedicated warning light, lamp, the like, or a combination thereof. The indication of clutch life may be an indication (e.g., as a percentage, a graph, etc.) of the spent clutch life and/or the remaining clutch life. In other embodiments, an indication of accumulated clutch wear is displayed instead of or in addition to an indication of clutch life. An illustrations of an example graphical indication of clutch life is shown below in FIG. 7, though clutch life may be indicated differently than the example in FIG. 7.

In some embodiments, an indication or alert may be presented when the clutch life reaches some threshold (e.g., a "limit wear condition"). For example, an alert may be presented when the accumulated clutch life is above some threshold value or when the remaining clutch life is below some threshold value. The threshold may correspond to an amount of accumulated wear that is almost at an unsafe level, for instance. Thus, the alert may indicate that the sprag clutch needs to be replaced. In some cases, the threshold may correspond to a maximum allowed accumulated life of the sprag clutch. In other cases, the threshold may correspond to an accumulated life that is less than a maximum allowed accumulated life.

The alert may be, for example, a graphical indication, a buzzer or voice prompt, a text indication such as a note or other warning on a display, or the like, or may be provided as a dedicated visual indicator such as a dedicated warning light, lamp, the like, or a combination thereof. The alert may be provided to a vehicle operator, a maintenance technician, a fleet operator, a vehicle, owner, or to an automated system. The alert may comprise automatically messaging a technician or owner, providing an indicator on a monitoring system, or the like. The alert may comprise an email, a short messaging system (SMS) message, a text message, an automated voice call, or the like. In other embodiments, the alert may comprise an indication on a management web page, maintenance checklist, vehicle record, or the like.

Figure 6A:
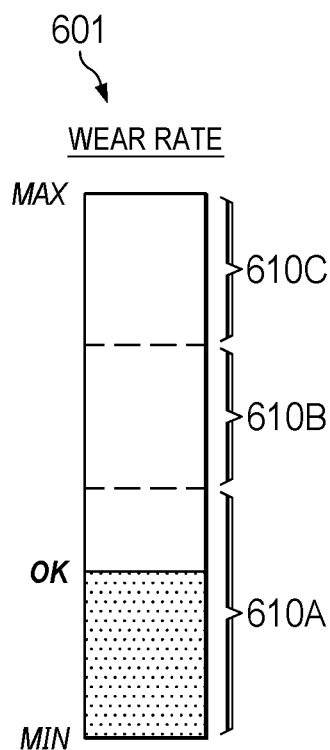
FIGS. 6A, 6B, and 6C illustrate a graphical indicator of clutch wear rates, in accordance with some embodiments.
Figure 6B:
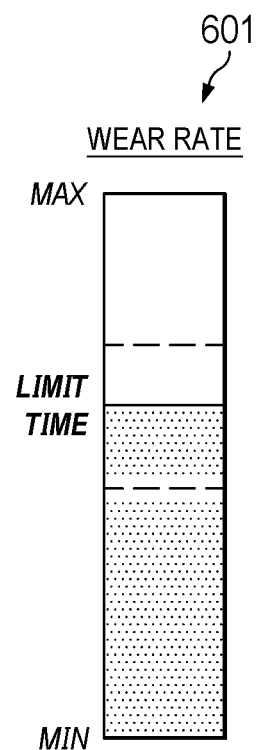
Figure 6C:
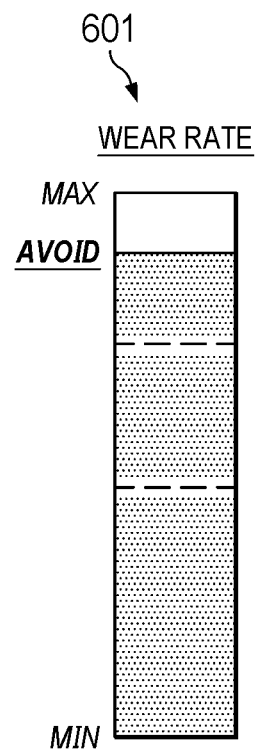

FIGS. 6A, 6B, and 6C illustrate an example graphical indicator 601 of clutch wear rates, in accordance with some embodiments. The indicator 601 may be displayed, for example, on screen or panel in a cockpit. The indications in FIGS. 6A-6C are intended as illustrative examples, and other indications are possible. FIGS. 6A-6C illustrate an indicator 601 displaying three different clutch wear rates. The clutch wear rates may be instantaneous wear rates determined using the techniques described above. The indicator 601 may be updated as new values of clutch wear rate are calculated. The indicator 601 has three wear ranges 610A-C, which may respectively correspond to "low," "medium," and "high" wear rates, for example. The wear ranges 610A-C are shown in FIGS. 6A-6C by dashed lines, but may or may not be shown on the indicator 601. The wear ranges 610A-C may correspond to ranges of calculated wear rates, such as the wear ranges 310A-C shown in FIG. 3. A different number or configuration of wear ranges is possible.

FIG. 6A shows the indicator 601 in an example "low wear" state, in which the determined wear rate is in the wear range 610A. The indicator 601 may indicate that the rotorcraft is in a low wear condition using a particular color or brightness and/or with a relevant text annotation (e.g. "OK"). FIG. 6B shows the indicator 601 in an example "medium wear" state, in which the determined wear rate is in the wear range 610B. The indicator 601 may indicate that the rotorcraft is in a medium wear condition using a particular color or brightness and/or with a relevant text annotation (e.g. "LIMIT TIME"). The text annotation may encourage the pilot to limit operational time within this wear range, for example. FIG. 6C shows the indicator 601 in an example "high wear" state, in which the determined wear rate is in the wear range 610C. The indicator 601 may indicate that the rotorcraft is in a high wear condition using a particular color or brightness and/or with a relevant text annotation (e.g. "AVOID"). The text annotation may encourage the pilot to avoid operation within this wear range, for example. In this manner, the pilot may be kept informed of rotorcraft operational conditions that result in greater sprag clutch wear.

Figure 7:
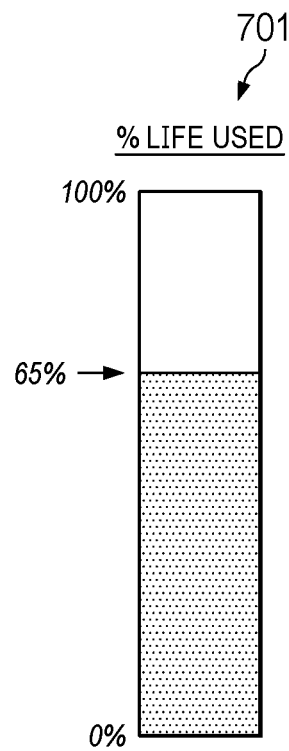
FIG. 7 illustrates a graphical indicator of accumulated total wear of a sprag clutch, in accordance with some embodiments.

FIG. 7 illustrates an example graphical indicator 701 of accumulated total wear of a sprag clutch, in accordance with some embodiments. The indicator 701 may be displayed, for example, on screen or panel in a cockpit. The indication in FIG. 7 is intended as an illustrative example, and other indications are possible. FIG. 7 illustrates an indicator 701 displaying the spent sprag life (e.g., "% life used," which is at "65%" in FIG. 7) as a percentage of maximum sprag life (e.g., "100%"). The maximum sprag life may correspond to a limit or threshold of accumulated total clutch wear. The spent sprag life may correspond to the current accumulated total clutch wear, which may be determined using the techniques described above. In some embodiments, the indicator 701 may present an alert (e.g., textual, color change, etc.) when the spent sprag life is at or near 100%. The alert may signify, for example, that the sprag clutch needs replacement or inspection. The indicator 701 may be updated as new values of accumulated total wear are calculated.

Figure 8:
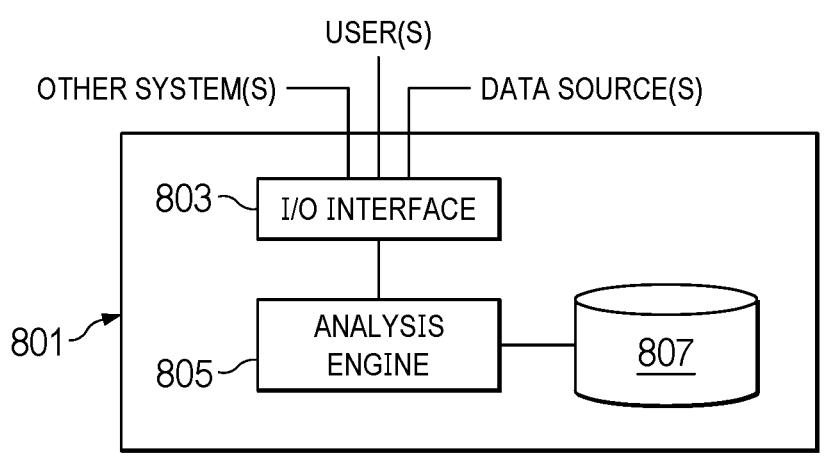
FIG. 8 is a diagram illustrating a computer system that may be used to implement a system, data terminal, or data server according to some embodiments.

FIG. 8 is a diagram illustrating a computer system 801 that may be used to implement a system, data terminal, or data server according to some embodiments. The computer system 801 can include an input/output (I/O) interface 803, an analysis engine 805, and a database 807. Alternative embodiments can combine or distribute the I/O interface 803, the analysis engine 805, and the database 807, as desired. Embodiments of the computer system 801 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 803 can provide a communication link between external users, systems, and data sources and components of the computer system 801. The I/O interface 803 can be configured for allowing one or more users to input information to the computer system 1001 via any known input device. Examples can include a keyboard, mouse, touch screen, and/or any other desired input device. The I/O interface 803 can be configured for allowing one or more users to receive information output from the computer system 801 via any known output device. Examples can include a display monitor, a printer, cockpit display, and/or any other desired output device. The I/O interface 803 can be configured for allowing other systems to communicate with the computer system 801. For example, the I/O interface 803 can allow one or more remote computer(s) to access information, input information, and/or remotely instruct the computer system 1001 to perform one or more of the tasks described herein. The I/O interface 803 can be configured for allowing communication with one or more remote data sources. For example, the I/O interface 803 can allow one or more remote data source(s) to access information, input information, and/or remotely instruct the computer system 801 to perform one or more of the tasks described herein.

The database 807 provides persistent data storage for the computer system 801. Although the term "database" is primarily used, a memory or other suitable data storage arrangement may provide the functionality of the database 807. In alternative embodiments, the database 807 can be integral to or separate from the computer system 801 and can operate on one or more computers. The database 807 preferably provides non-volatile data storage for any information suitable to support the operation of the clutch monitoring system 401 and the process 501, including various types of data discussed further herein. The analysis engine 805 can include various combinations of one or more processors, memories, and software components.

Embodiments described herein utilize the speeds of the inner and outer elements of a sprag clutch to determine a Pressure-Velocity (PV) parameter that can be used to calculate a wear factor. This factor can incorporate the starting surface finish of a new component and track the wear rate and accumulated wear as the surface polishes to a smoother surface finish. This wear rate is a non-linear function of pressure, velocity, surface finish, and lubricant film thickness. As the surface polishes, this wear rate decreases. The techniques described herein keep track of this polishing over time and may be used to determine a limit wear condition that is determined to be the point where the clutch components should be replaced. It also allows for an instantaneous wear rate indicator that can be used by the pilot to adjust the operating conditions to minimize the wear rate.

Embodiments may achieve advantages. Techniques described herein provide a real-time method of presenting overrunning clutch condition and wear rate to the pilot. For example, the wear rate may correspond to a wear rate of a surface within a clutch, a wear rate of the sprags within a clutch, the like, or a combination thereof. The wear rate may also be used to determine accumulated clutch wear. Techniques described herein can more accurately determine when maintenance action is required, and allow for timely replacement of clutch components prior to experiencing undesirable failure modes. Techniques described herein allow for an accurate assessment of clutch remaining life based on actual operating conditions and not a fixed time replacement interval, which can allow for saving on overhaul costs. In this manner, techniques described herein provide the capability for operators to establish flight procedures to prolong clutch service life.

An embodiment method includes measuring a first rotational speed of a first element of a sprag clutch of a rotorcraft, measuring a second rotational speed of a second element of the sprag clutch, determining if the sprag clutch is in an overrunning condition based on the first rotational speed and the second rotational speed, generating an estimation of an instantaneous wear rate of the sprag clutch, and displaying an indication of the estimation of the instantaneous wear rate of the sprag clutch. The estimation of the instantaneous wear rate is generated based on the first rotational speed and the second rotational speed.

In some embodiments, the method includes generating an estimation of an accumulated wear of the sprag clutch, wherein the estimation of the accumulated wear is based on the estimation of the instantaneous wear rate and displaying an indication of the estimation of the accumulated wear of the sprag clutch. In some embodiments, the indication of the estimation of the accumulated wear of the sprag clutch includes an indication of the used life of the sprag clutch, wherein the indication of the used life of the sprag clutch is based on the estimation of the accumulated wear of the sprag clutch. In some embodiments, the method includes determining a wear range that corresponds to the estimation of the instantaneous wear rate, wherein the indication of the estimation of the instantaneous wear rate is based on the determined wear range. In some embodiments, generating an estimation of the instantaneous wear rate of the sprag clutch is based on a pressure-velocity factor, in which the pressure-velocity factor is a non-linear function of the first rotational speed and the second rotational speed. In some embodiments, generating an estimation of the instantaneous wear rate of the sprag clutch is based on a ratio between lubricant film thickness and surface roughness within the sprag clutch. In some embodiments, the surface roughness is based on a previously generated estimation of the instantaneous wear rate of the sprag clutch. In some embodiments, the sprag clutch mechanically couples two engines of the rotorcraft.

An embodiment clutch wear monitoring system includes a first sensor operable to measure a first rotational speed of a first element of a clutch and generate a first sensor signal associated with the first rotational speed and a second sensor operable to measure a second rotational speed of a second element of the clutch and generate a second sensor signal associated with the second rotational speed. The embodiment clutch wear monitoring system also includes a controller configured to receive the first sensor signal from the first sensor, receive the second sensor signal from the second sensor, determine an overrunning condition of the clutch based on the first sensor signal and the second sensor signal, determine a surface wear rate for the clutch based on the overrunning condition, the first sensor signal, and the second sensor signal. The controller is also configured to generate a wear signal associated with the surface wear rate. The embodiment clutch wear monitoring system also includes a display panel configured to receive the wear signal from the controller and display an indication of the surface wear rate based on the wear signal.

In some embodiments, the clutch is a sprag clutch. In some embodiments, the controller is further configured to determine a total amount of surface wear and generate a total wear signal associated with the total amount of surface wear. In some embodiments, the display panel is further configured to receive the wear total signal from the controller and display an indication of the total amount of surface wear based on the total wear signal. In some embodiments, the display panel is configured to provide an alert when the total amount of surface wear reaches a threshold value. In some embodiments, the display panel is configured to display a first indication when the surface wear rate is within a first range of values and is configured to display a second indication when the surface wear rate is within a second range of values, wherein the first indication is visually distinguished from the second indication. In some embodiments, the display panel is configured to provide an alert when the surface wear rate is within a third range of values.

An embodiment device includes a processor and a non-transitory computer-readable storage medium storing a program to be executed by the processor. The program includes instructions for monitoring an inner element speed of an inner element of a sprag clutch, monitoring an outer element speed of an outer element of the sprag clutch, determining a pressure-velocity parameter for the sprag clutch, wherein the pressure-velocity parameter is based on the inner element speed and the outer element speed, determining a wear rate for the inner element of the sprag clutch, wherein the wear rate is based on the pressure-velocity parameter, and providing an indication of the wear rate on an instrument panel.

In some embodiments, the pressure-velocity parameter depends on a difference between the inner element speed and the outer element speed. In some embodiments, the program includes instructions for integrating the wear rate to determine an accumulated wear. In some embodiments, the processor is a flight control computer (FCC) of a fly-by-wire (FBW) system of a rotorcraft. In some embodiments, the program includes instructions for controlling the flight of the rotorcraft based on the wear rate.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   measuring a first rotational speed of a first element of a sprag clutch of a rotorcraft;
   measuring a second rotational speed of a second element of the sprag clutch;
   determining if the sprag clutch is in an overrunning condition, wherein the determining is based on the first rotational speed and the second rotational speed;
   generating an estimation of an instantaneous wear rate of the sprag clutch, wherein the estimation of the instantaneous wear rate is generated based on the first rotational speed and the second rotational speed; and displaying an indication of the estimation of the instantaneous wear rate of the sprag clutch.

2. The method of claim 1 further comprising:
generating an estimation of an accumulated wear of the sprag clutch, wherein the estimation of the accumulated wear is based on the estimation of the instantaneous wear rate; and
displaying an indication of the estimation of the accumulated wear of the sprag clutch.

3. The method of claim 2, wherein the indication of the estimation of the accumulated wear of the sprag clutch comprises an indication of the used life of the sprag clutch, wherein the indication of the used life of the sprag clutch is based on the estimation of the accumulated wear of the sprag clutch.

4. The method of claim 1 further comprising determining a wear range of a plurality of wear ranges that corresponds to the estimation of the instantaneous wear rate, wherein the indication of the estimation of the instantaneous wear rate is based on the determined wear range.

5. The method of claim 1, wherein generating the estimation of the instantaneous wear rate of the sprag clutch is based on a pressure-velocity factor, in which the pressure-velocity factor is a non-linear function of the first rotational speed and the second rotational speed.

6. The method of claim 1, wherein generating the estimation of the instantaneous wear rate of the sprag clutch is based on a ratio between lubricant film thickness and surface roughness within the sprag clutch.

7. The method of claim 6, wherein the surface roughness is based on a previously generated estimation of the instantaneous wear rate of the sprag clutch.

8. The method of claim 1, wherein the sprag clutch mechanically couples two engines of the rotorcraft.

9. A clutch wear monitoring system, comprising:
a first sensor operable to measure a first rotational speed of a first element of a clutch and generate a first sensor signal associated with the first rotational speed;
a second sensor operable to measure a second rotational speed of a second element of the clutch and generate a second sensor signal associated with the second rotational speed;
a controller configured to:
receive the first sensor signal from the first sensor;
receive the second sensor signal from the second sensor;
determine an overrunning condition of the clutch based on the first sensor signal and the second sensor signal;
determine a surface wear rate for the clutch based on the overrunning condition, the first sensor signal, and the second sensor signal; and
generate a wear signal, wherein the wear signal is associated with the surface wear rate; and
a display panel configured to receive the wear signal from the controller and display an indication of the surface wear rate based on the wear signal.

10. The clutch wear monitoring system of claim 9, wherein the clutch is a sprag clutch.

11. The clutch wear monitoring system of claim 9, wherein the controller is further configured to determine a total amount of surface wear and generate a total wear signal associated with the total amount of surface wear.

12. The clutch wear monitoring system of claim 11, wherein the display panel is further configured to receive the total wear signal from the controller and display an indication of the total amount of surface wear based on the total wear signal.

13. The clutch wear monitoring system of claim 12, wherein the display panel is configured to provide an alert when the total amount of surface wear reaches a threshold value.

14. The clutch wear monitoring system of claim 9, wherein the display panel is configured to display a first indication when the surface wear rate is within a first range of values and is configured to display a second indication when the surface wear rate is within a second range of values, wherein the first indication is visually distinguished from the second indication.

15. The clutch wear monitoring system of claim 14, wherein the display panel is configured to provide an alert when the surface wear rate is within a third range of values.

16. A device, comprising:
a processor; and
a non-transitory computer-readable storage medium storing a program to be executed by the processor, the program comprising instructions for:
monitoring an inner element speed of an inner element of a sprag clutch;
monitoring an outer element speed of an outer element of the sprag clutch;
determining a pressure-velocity parameter for the sprag clutch, wherein the pressure-velocity parameter is based on the inner element speed and the outer element speed;
determining a wear rate for the inner element of the sprag clutch, wherein the wear rate is based on the pressure-velocity parameter; and
providing an indication of the wear rate on an instrument panel.

17. The device of claim 16, wherein the pressure-velocity parameter depends on a difference between the inner element speed and the outer element speed.

18. The device of claim 16, wherein the program comprises instructions for integrating the wear rate to determine an accumulated wear.

19. The device of claim 16, wherein the processor is a flight control computer (FCC) of a fly-by-wire (FBW) system of a rotorcraft.

20. The device of claim 19, wherein the program comprises instructions for controlling the flight of the rotorcraft based on the wear rate.

* * * * *